United States Patent [19]
McKinlay

[11] Patent Number: 5,080,545
[45] Date of Patent: Jan. 14, 1992

[54] LOCK WASHER ASSEMBLY HAVING WEDGE LOCK ACTION

[75] Inventor: Alistair N. McKinlay, Marina Del Rey, Calif.

[73] Assignee: Hong Kong Disc Lock Company Limited, Rep. of Korea

[21] Appl. No.: 648,044

[22] Filed: Jan. 30, 1991

[51] Int. Cl.⁵ .................. F16B 39/24; F16B 39/282
[52] U.S. Cl. ..................................... 411/149; 411/136
[58] Field of Search ................. 411/136, 144–146, 411/149, 150, 535, 134

[56] References Cited

U.S. PATENT DOCUMENTS

| | | |
|---|---|---|
| 3,263,727 | 8/1966 | Herpolsheimer . |
| 3,329,190 | 7/1967 | Oldenkott ........................... 411/149 |
| 3,895,663 | 7/1075 | Bashline et al. ..................... 411/136 |
| 4,538,313 | 9/1985 | Frieberg ............................. 411/149 |
| 4,704,058 | 11/1987 | Crunwell ........................... 411/149 |
| 4,708,555 | 11/1987 | Terry ................................. 411/149 |

*Primary Examiner*—Neill R. Wilson
*Attorney, Agent, or Firm*—Charles W. Chandler

[57] ABSTRACT

A lock washer assembly in which two washers are used in back-to-back relation. One face of each washer is serrated to form a series of circumferentially extending cam surfaces; the other face of each washer is flat and devoid of any projections or surface discontinuities. When the lock washers are arranged between a workpiece and a fastener element (nut or head of a bolt) the cam surfaces act as wedge lock devices; and any tendency of the fastener element to unloosen increases the contact pressure of the flat washer faces on the workpiece and fastener element.

4 Claims, 1 Drawing Sheet

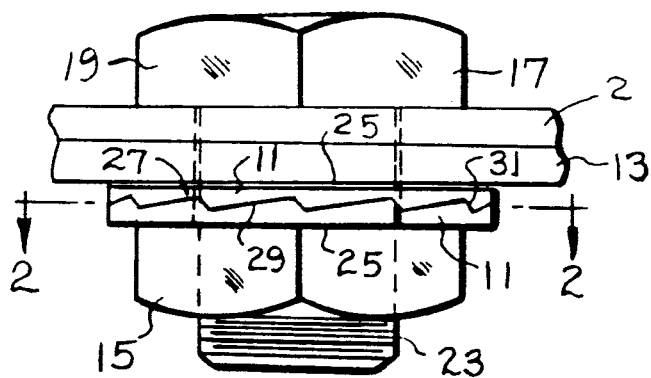
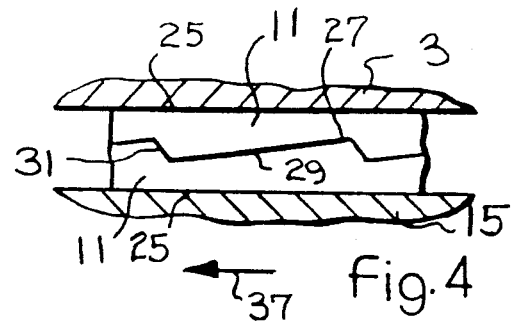
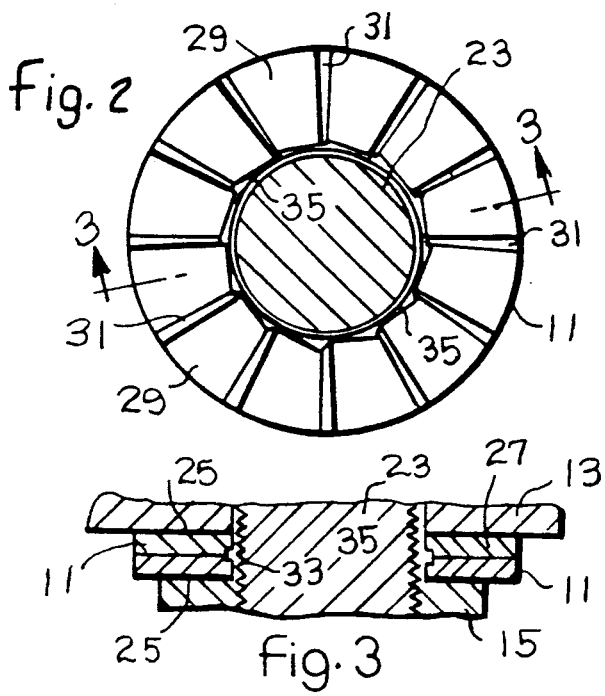
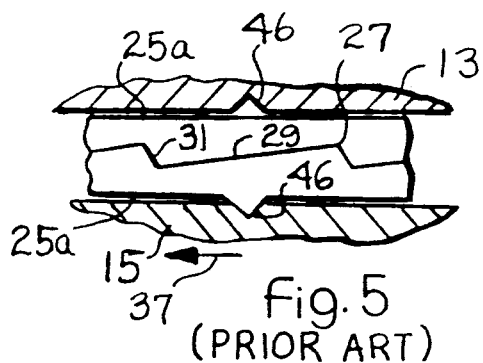
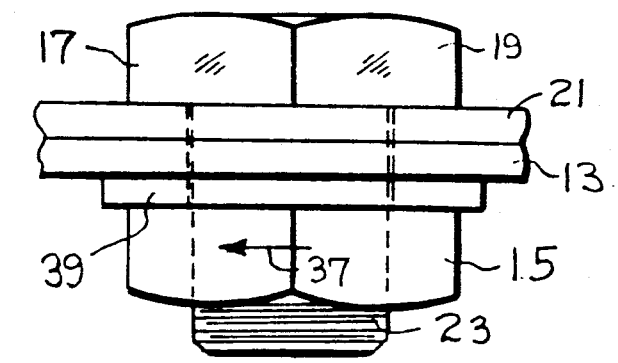

LOCK WASHER ASSEMBLY HAVING WEDGE LOCK ACTION

BACKGROUND OF THE INVENTION

This invention relates to a look washer assembly adapted for use between a threaded fastener nut (or the head portion of a bolt) and the surface of a workpiece that is being fastened to another workpiece. The lock assembly comprises two similarly configured lock washers, each having a flat face and a serrated face formed with a series of circumferentially-spaced, wedge shaped cam surfaces. The serrated faces of the individual lock washers are engaged together, such that rotation of the fastener nut in the loosening direction, as by a vibrating condition, causes the serrated faces to slide against each other such that one of the washers becomes wedged with respect to the other washer, filling any space between the washers caused by the vibrations.

U.S. Pat. No. 3,263,727 to A. Herpolsheimer shows a lock washer assembly comprising two individual lock washers arranged with cammed faces in mutual engagement. The outer faces of the lock washers have serrations which "must dig into the member 36 and nut 38 to depths wherein they will not be disengaged as the bolt elongates". (Col. 3, lines 48-51) designed to become embedded in the opposed surfaces of a workpiece and a fastener element (i.e. a threaded nut or the head of a threaded bolt). The intent is to have the teeth "bite" into the associated surface to prevent slippage between the washer and the workpiece or threaded element. Herpolsheimer indicates that the projecting teeth exert a cutting action on the opposed surface to remove small portions of the metal. The teeth plow into the metal surface.

One disadvantage of such toothed structures is that the surface on the workpiece or fastener element has to be relatively soft in order for the teeth to exert the desired cutting action.

Another disadvantage of the toothed structure is that they form gouges in the workpiece. Such gouges can form stress riser cracks leading to fatigue failure of the workpiece.

SUMMARY OF THE INVENTION

This invention contemplates a lock washer assembly wherein two individual lock washers have cammed surfaces in facial engagement. The opposite surfaces of the lock washers are flat annular faces, devoid of projections or discontinuities. An elongation of the threaded fastener element (nut or bolt), caused by vibration, causes the cammed faces to slide against each other, uninhibited by the conventional serrated or ribbed surfaces, thereby unexpectedly permitting the washers to slide to their wedged, locked condition. The lock washers have a wedge lock action to prevent the fastener element from unloosening in response to cyclic load forces.

A principal advantage of this lock washer assembly is that it does not require that the workpiece have a soft surface. Also, the lock washers do not have to be formed of a hardened material.

Another advantage of the lock washer assembly of this invention is that no gouges or surface cracks are formed in the workpiece. The workpiece retains its as-manufactured strength and integrity. This is important in some industries such as the aircraft industry which uses considerable amounts of aluminum.

THE DRAWINGS

FIG. 1 is an elevational view of a fastener arrangement having a lock washer assembly of the present invention incorporated therein.

FIG. 2 is a sectional view taken on line 2—2 in FIG. 1.

FIG. 3 is a sectional view taken on line 3—3 in FIG. 2.

FIG. 4 is a fragmentary enlarged view of the FIG. 1 lock washer assembly.

FIG. 5 is a view taken in the same direction as FIG. 4, but illustrating a prior art lock washer arrangement.

FIG. 6 is an elevational view taken in the same direction as FIG. 1, but illustrating the use of a conventional flat washer.

DESCRIPTION OF A PREFERRED EMBODIMENT OF THE INVENTION

FIGS. 1 through 3 illustrate a lock washer assembly embodying features of the invention. The lock washer assembly comprises two similarly configured lock washers 11 arranged between a sheet-like workpiece 13 and an internally threaded fastener nut 15. A fastener bolt 17 has a head 19 seated against a second workpiece 21. A threaded shank portion 23 of the fastener bolt extends through aligned openings in workpieces 13 and 21 into meshed engagement with internal threads in nut 15.

Each lock washer 11 has a flat face 25 and a serrated or cammed face 27. Each serrated face has twelve circumferentially-spaced cam surfaces 29 extending therearound. The cam surfaces are interconnected by shoulder surfaces 31.

Each cam surface 29 extends at an acute angle to the plane of the associated flat annular face 25. The preferred cam surface angulation is approximately ten degrees, as viewed in FIGS. 1 and 4. Each shoulder surface 31 is angled to the plane of flat face 25 at approximately sixty degrees, although this angulation is not critical. The angulation of each cam surface 29 is somewhat critical, since it should be greater than the pitch angle (or lead angle) of the threads on bolt 17.

Each lock washer has an annular inner edge 33 sized to closely surround the threaded shank area of bolt 17. The area of each cammed face 27 extending along the annular edge 33 is recessed, as at 35, so that edge 33 has a cylindrical surface contour devoid of projecting sharp edges (or burrs). Cam surfaces 29 and shoulder surfaces 31 terminate radially outwardly from annular edge 33, so as to be out of potential interference contact with the thread surfaces.

As previously noted, lock washers 11 are similarly configured, i.e. they are identical. The lock washers are arranged with serrated faces 27 engaged together. Flat faces 25 are in facial engagement with workpiece 13 and nut 15. Arrow 37 in FIG. 4 represents the unloosening direction for nut 15. When load forces tend to rotate the nut in the unloosening direction, or shank 23 elongates, the cam surface on the upper washer will ride up the cam surface on the lower washer, into a wedged condition preventing the nut from being further loosened. The lock washers act as locking wedges between the nut and workpiece 13.

FIG. 5 schematically illustrates the prior art arrangement shown in U.S. Pat. No. 3,263,727. Teeth 46 are formed on the otherwise flat faces 25a of the lock washers. The teeth are by design intended to cut into the opposed surfaces on workpiece 13 and nut 15. An adverse effect of the cutting action is that the contact pressure of the lock washer faces 25a is necessarily reduced according to the penetration resistance offered by the materials used for the workpiece or fastener nut. If these materials are of sufficient hardness faces 25a may be entirely out of contact with the workpiece surface or nut surface, as illustrated in FIG. 5.

Cutter teeth 46 concentrate the load forces on the areas of the workpiece and fastener nut in direct contact with the teeth. As a result, there is a lessened wedge lock action and an increased cutting (plowing) action. With the FIG. 5 arrangement, the surfaces of the workpiece necessarily have to be disfigured by the gouging action of teeth 46.

FIG. 6 shows a conventional flat washer 39 arranged between workpiece 13 and nut 15. There is no wedge lock action. Rotational movement of the nut in the arrow 37 direction is resisted only by the frictional contact forces between the flat washer faces and the flat surfaces on the workpiece and the nut. If there is any sliding motion between the nut and the washer or between the washer and the workpiece, the nut will become unloosened, as is well known to those skilled in the fastener art.

The use of flat washer faces, as shown in FIG. 6, will not produce a wedge lock action. The wedge lock action requires flat washer surfaces and serrated cam surfaces in combination, as shown in FIGS. 1 and 4.

What is claimed is:

1. A lock washer assembly adapted for disposition between a flat workpiece surface and an opposed flat surface on a threaded fastener element; said lock washer assembly comprising two similarly configured individual annular lock washers; each individual lock washer having a first flat annular face, and a second annular serrated face; each serrated face comprising a plural number of circumferentially-spaced cam surfaces extending at acute angles to the plane of the associated flat annular face, and shoulder surfaces interconnecting said cam surfaces; said individual lock washers being arranged with their cam surfaces and shoulder surfaces in facial engagement, and with their flat faces in facial engagement with the aforementioned opposed surfaces on the workpiece and fastener element; the flat annular face on each lock washer being continuous and devoid of projections or discontinuities, whereby rotary motion of the fastener element in the loosening direction causes the cam surfaces to slide against each other toward a mutually wedged position.

2. The lock washer assembly of claim 1, wherein the cam surfaces are angled to the flat annular lock washer faces at approximately ten degrees, and the shoulder surfaces are angled to the flat annular lock washer faces at approximately sixty degrees.

3. The lock washer assembly of claim 1, wherein each lock washer has an annular inner edge, each serrated face having a flat recessed area extending along the associated inner edge, whereby the inner edge has a cylindrical surface contour devoid of projecting sharp edges.

4. The lock washer assembly of claim 3, wherein said lock washers are formed of a material that has a greater hardness than the workpiece.

* * * * *